United States Patent [19]

Reisacher

[11] Patent Number: 5,978,845

[45] Date of Patent: Nov. 2, 1999

[54] NETWORK MANAGEMENT RELAY MECHANISM

[75] Inventor: Olivier Michel Reisacher, Grenoble, France

[73] Assignee: Sun Microsystems, Inc., Palo Alto, Calif.

[21] Appl. No.: 08/824,232

[22] Filed: Mar. 25, 1997

[51] Int. Cl.$^6$ .................................................. G06F 15/16
[52] U.S. Cl. .......................................... 709/223; 709/202
[58] Field of Search ........................ 395/200.53, 200.54; 709/223, 224, 202

[56] References Cited

U.S. PATENT DOCUMENTS

| | | | |
|---|---|---|---|
| 5,651,006 | 7/1997 | Fujino et al. | 370/408 |
| 5,678,006 | 10/1997 | Valizadeh et al. | 395/200.02 |
| 5,734,651 | 3/1998 | Blakeley et al. | 370/392 |
| 5,758,083 | 5/1998 | Singh et al. | 395/200.53 |
| 5,841,990 | 11/1998 | Picayo, Jr. et al. | 395/200.79 |

OTHER PUBLICATIONS

J. Case, "A Simple Network Management Protocol (SNMP)," RFC 1157, MIT Laboratory For Computer Science, pp. 1–36, May 1990.

M. Rose, "Structure and Identification of Management Information for TCP/IP–Based Internets," RFC 1155, Hughes LAN Systems, pp. 1–20, May 1990.

K. McCloghrie, "Management Information Base for Network Management of TCP/IP–Based Internet: MIB–II," RFC 1213, Performance Systems International Editors, pp. 1–70, Mar. 1991.

S. Kille, "Mart Monitoring MIB," RFC 1566, Innsoft, pp. 1–20, Jan. 1994.

William Stallings, "Data and Computer Communications," Maxwell MacMillan International, 4th Edition, 1994, pp. 701–748.

*Primary Examiner*—Mehmet B. Geckil
*Attorney, Agent, or Firm*—Conley, Rose & Tayon, PC; B. Noel Kivlin

[57] ABSTRACT

A relay mechanism for a network management system permits ready extension and/or modification to an existing system through the use of standard network protocol agents. The relay mechanism uses standard SNMP messaging for both local and remote communication. Only the SNMP relay mechanism is connected to UDP port 161 into listen for management application requests. In operation, the relay examines incoming SNMP requests from a management application and, based on a number of parameters, creates one or more individual smaller SNMP requests which are relayed to the individual agents. When the SNMP relay mechanism receives all the responses to the local SNMP requests, it marshals the information into a single response which is then sent back to the management application.

25 Claims, 9 Drawing Sheets

NETWORK MANAGEMENT RELAY MECHANISM

BACKGROUND AND INTRODUCTION

This invention relates to network management, and in particular to the support of a plurality of network management agents.

In order to manage a network, it is useful to be able to collect statistics about messaging traffic, provide assistance with load balancing, get early warning of potential problems, look out for attempted security violations, carry out trouble shooting operations and remotely configure a messaging application.

Network management systems have been proposed for addressing these matters. A typical structure which has been adopted is to provide a management application operating on a management workstation which communicates with individual managed systems via an information processing network. The managed systems are provided with agents which handle requests for information from the management application and send out alarms when necessary.

The management application, or manager, typically includes various tools for determining a view of messaging applications running on the managed machines, statistical tools for providing statistical information regarding the operation of the network, various presentational tools for displaying such statistical information and mechanisms for enabling the configuration of messaging applications. The communication between the management application or console and the managed system will normally be via the network system concerned, for example via the Internet. For a network management system, operating over the Internet, a so-called 'Simple Network Management Protocol' (SNMP) has been proposed (RFC 1157). SNMP is a standard protocol designed to offer simple management services for TCP/IP (Transmission Control Protocol/Internet Protocol) networks. In the appropriate terminology, when an agent and a management application communicate using SNMP, they form an SNMP community identified by a community name. The messages that the agent and the management application exchange always contain this community name as a simple authentication method.

An SNMP operation can be one of the following: GET, GET-NEXT, or TRAP. A management application uses the GET and GET-NEXT operations to send a request to an SNMP agent (GET-REQUEST or GET-NEXT-REQUEST). SNMP agents use the GET-RESPONSE operation to send a response to a request from the management application. SNMP agents also use the TRAP operation to send unsolicited event reports, for example for reporting faults or errors.

FIG. 1 of the accompanying drawings is a schematic representation of such a management structure with a management console 24 communicating with a managed system 10 via an Internet Protocol network 22. At the managed system 10, an SNMP agent 14 is connected to the Internet Protocol network via a UDP/IP (User Datagram Protocol/Internet Protocol) interface 12. In TCP/IP, UDP is a packet-level protocol built directly on the Internet Protocol layer. UDP is used for application-to-application programs between TCP/IP host systems.

Internet standards groups have also defined the so-called Management Information Base (MIB). This forms a global information model for network management. The information model is described in FRC 1155: "Structure and Identification for TCP/IP-Based Internets. This model contains information objects that are organised in a tree structure to allow for future extensions. FIG. 2 of the accompanying drawings is a schematic representation of part of the global information model. An example of a standard MIB is defined in RFC 1213: "Management Information Base for network Management of TCP/IP-Based Internets: MIB II". Further details on SNMP and MIBs can be also be found in "Data and Computer Communications" (4th Edition) by William Stallings, Maxwell MacMillan International, 1994 ISBN 02-415441-5, pages 701–724)

Sub-trees of the global MIB tree, which address a particular area of network management, are also called MIBs. For example, there is a Mail Monitoring MIB ((RFC1566) for message transfer agents.

Each object in the global MIB has a meaningful English-language object name and a Unique Object Identifier (OID). The English language object name reflects the semantic contents of the object, whereas the OID is a sequence of numbers that is obtained by combining the OIDs of all objects in the 'path' between the root and a particular object. The OID indicates the exact location of the corresponding object in the global MIB. For example, the application table object shown at the bottom left of FIG. 2 has the object name 'applTable' and the OID 1.3.6.1.2.1.27.1.

Standard information objects designed to manage and monitor systems and applications are included under the management sub-tree 'mgmt(2)'. The 'application (27)' sub-tree and the tables below, 'applTable' and 'assocTable', are defined in the Network Services Monitoring MIB. Information objects, or variables, that are to be found in these tables, are not shown in FIG. 2.

An SNMP agent can support an entire sub-tree of the global MIB, or specific tables or individual objects. An SNMP agent operates such that it supports particular objects within the sub-tree and, on receipt of a request from a management application, will return the values of the MIB objects which it supports. For example, a management application might query a server SNMP agent for information such as application status, number of associations between applications, and number of volume of messages transmitted or stored.

Thus, for example, a server agent might monitor a messaging server and an Internet adaptor and support extensions for handling messages, storing data and traps. The MIBs will describe the type of information an SNMP agent can collect.

The SNMP standard states that an SNMP agent must wait on the so-called UDP port 161 for incoming requests. This effectively means that a managed system can only have one agent. Although as indicated above, an agent could manage a complete MIB sub-tree, in practice, SNMP agents are typically configured to support specific tables or individual objects or groups of objects from within the MIB. If, therefore, one wishes to use standard SNMP agents, this has had the effect of restricting the level of management which is possible on any given managed system.

It would be possible to create new super agents which are capable of managing all the tasks required at a managed system, but this would be a very expensive solution. Also, it has been proposed to provide a multiplexing mechanism connected to UDP port 161, but the proposed solutions have all required modifications to standard SNMP agents in order to achieve operability. These solutions have not found acceptance.

Accordingly, there is a need for a solution to the problems described above which is acceptable to the industry.

SUMMARY OF THE INVENTION

In accordance with an aspect of the invention, there is provided a method of interfacing a plurality of local network management agents to an information network where each agent can provide a subset of management operations. The method comprises steps of:

a)(i) analyzing a request received from the network under a predetermined network management protocol to identify each management operation to be performed and to identify an agent for performing each identified operation;

a)(ii) dividing the received request where more than one agent is identified;

a)(iii) forwarding, under the protocol, one or more local requests derived from the received request to the respective identified agent or agents;

b)(i) waiting for and receiving a local response under the protocol for each of the local requests from the identified agent or agents; and b)(ii) forming, from the local response or responses, a response under the protocol to the received request to be transmitted over the network.

By using the standard management protocol for both local and remote communication the relay can be made transparent to the local agents and to the management application. For use with the Internet, the protocol is preferably the SNMP protocol. In this case, only the relay needs to be connected to UDP port 161 to listen for management application requests. In operation, the relay examines incoming SNMP requests from a management application and based on a number of parameters, creates one or more individual smaller SNMP requests which are relayed to the individual agents. When the SNMP relay mechanism receives all the responses to the local SNMP requests, it marshals the information into a single response which is then sent back to the management application.

Preferably, step (a)(i) comprises accessing a routing table to identify the management operations performed by each locally connected agent.

In order to enable the local responses to the local requests derived from a particular received request to be identified correctly, the method preferable comprises an additional step (a)(iv) of storing in a memory, for each received request, the identity of each local request derived therefrom and the agent to which each local request is forwarded. Then step (b)(i) preferably comprises accessing the memory to identify received requests for which a reply is needed and each local request for which a local reply is needed for building the response to the received request.

Preferably also, in order to aid identification of the correct local responses, step (a)(iii) preferably comprises allocating a request identifier (possibly, but not necessarily, a unique identifier) to each local request, each request identifier of a local request derived from a received request being derived from the request identifier of the received request.

In accordance with another aspect of the invention, there is provided a network management relay mechanism for interfacing a plurality of local network management agents to an information network where each agent can provide a subset of management operations, the network management relay mechanism comprising:

a request routing mechanism configured to provide functions, in use, of analyzing a request received from the network under a predetermined network management protocol to identify each management operation to be performed and to identify an agent for performing each identified operation, dividing the received request where more than one agent is identified and forwarding one or more local requests derived from the received request to the respective identified agent or agents, each local request being forwarded under the protocol; and a response mechanism configured to provide functions, in use, of waiting for and receiving a local response under the protocol to each of the local requests from the identified agent or agents, and forming, from the local response or responses, a response under the protocol to the received request to be transmitted over the network. The relay mechanism can be implemented by means of a computer program.

In accordance with a further aspect of the invention, there is provided a network management relay program on a storage medium, said network management relay program being configured to be operable to interface a plurality of local network management agents to an information network where each agent can provide a subset of management operations and comprising:

a request routing mechanism configured to be operable to provide functions of analyzing a request received from said network under a predetermined network management protocol to identify each management operation to be performed and to identify an agent for performing each identified operation, dividing said received request where more than one agent is identified and forwarding one or more local requests derived from said received request to said respective identified agent or agents, each local request being forwarded under said protocol; and a response mechanism configured to be operable to provide functions of waiting for and receiving a local response under said protocol to each of said local requests from said identified agent or agents, and forming, from said local response or responses, a response under said protocol to said received request to be transmitted over said network.

In accordance with yet a further aspect of the invention, there is provided apparatus comprising processing means connectable to an information network, a plurality of local network management agents, where each agent can provide a subset of management operations, and a software relay mechanism for connecting the plurality of local network management agents to the information network, the relay mechanism comprising:

a request routing mechanism configured to provide functions, in use, of analyzing a request received from the network under a predetermined network management protocol to identify each management operation to be performed and to identify an agent for performing each identified operation, dividing the received request where more than one agent is identified and forwarding one or more local requests derived from the received request to the respective identified agent or agents, each local request being forwarded under the protocol; and a response mechanism configured to provide functions, in use, of waiting for and receiving a local response under the protocol to each of the local requests from the identified agent or agents, and for forming, from the local response or responses, a response under the protocol to the received request to be transmitted over the network.

DESCRIPTION OF THE DRAWINGS

Particular embodiments of the invention will be described hereinafter with reference to the accompanying drawings in which.

DESCRIPTION OF THE PREFERRED EMBODIMENT

Figure 3:
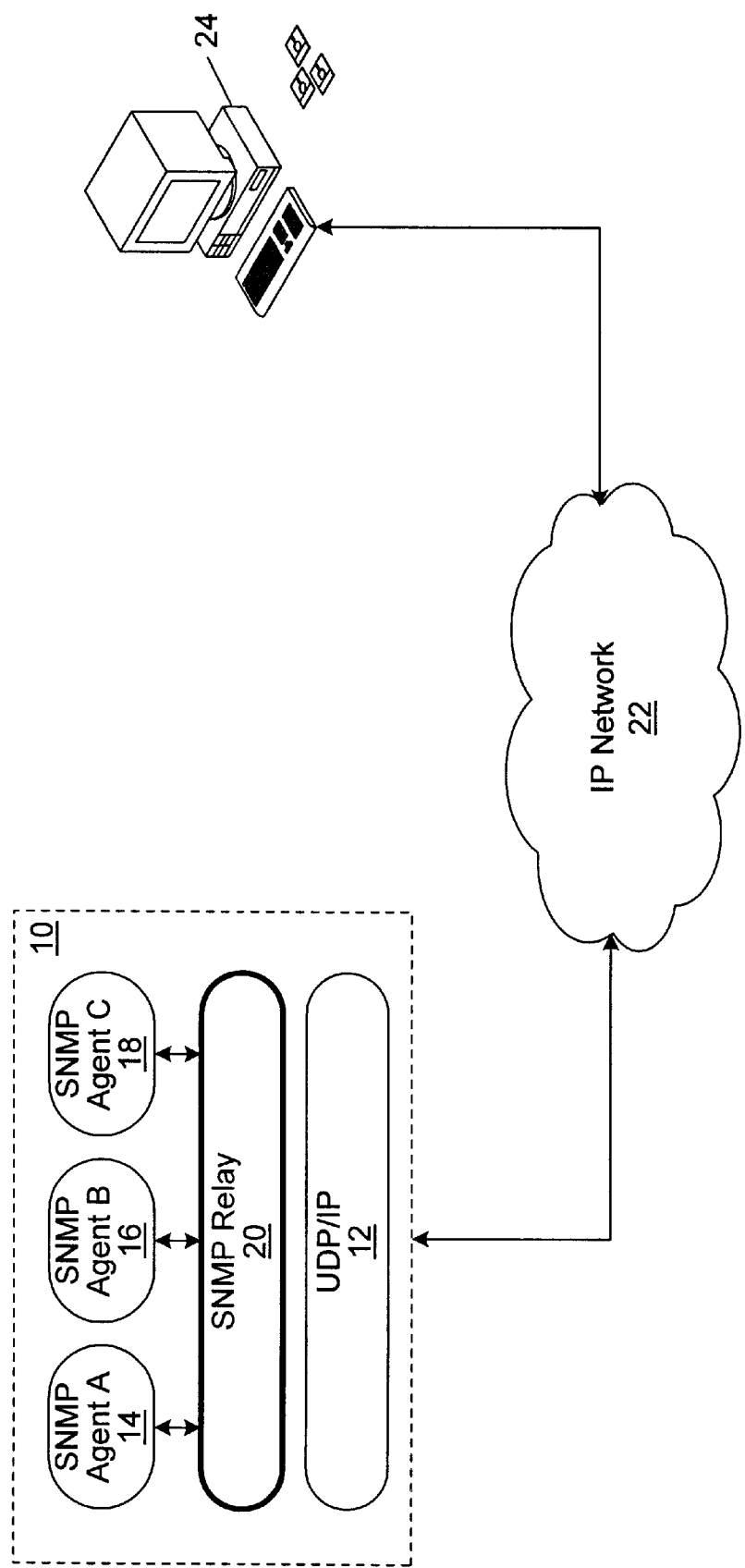
FIG. 3 is a schematic representation of an example of the present invention in a management information system.

FIG. 3 is a schematic representation of the use of a relay mechanism 20 of an embodiment of the invention in a network management system. The relay mechanism 20 is inserted between a standard UDP/IP (User Datagram Protocol/Internet Protocol) interface 12 at UDP port 161 and a plurality of SNMP agents 14, 16 and 18. The managed system 10 could be a standard workstation having various components including one or more processors and one or more different storage media including read only memory, random access memory, hard and floppy drive devices, tape streamers, etc, and input/output devices such as keyboards, a mouse, a display screen, communications adaptors, and so on. The workstation could act as a server, or as a client within a local area network, or any other computing system. Indeed, the managed system could also comprise any managed piece of equipment which has a primary function other than that of data processing, for example a managed component of a production line, retail operation, telecommunications system, and so on.

Figure 4:
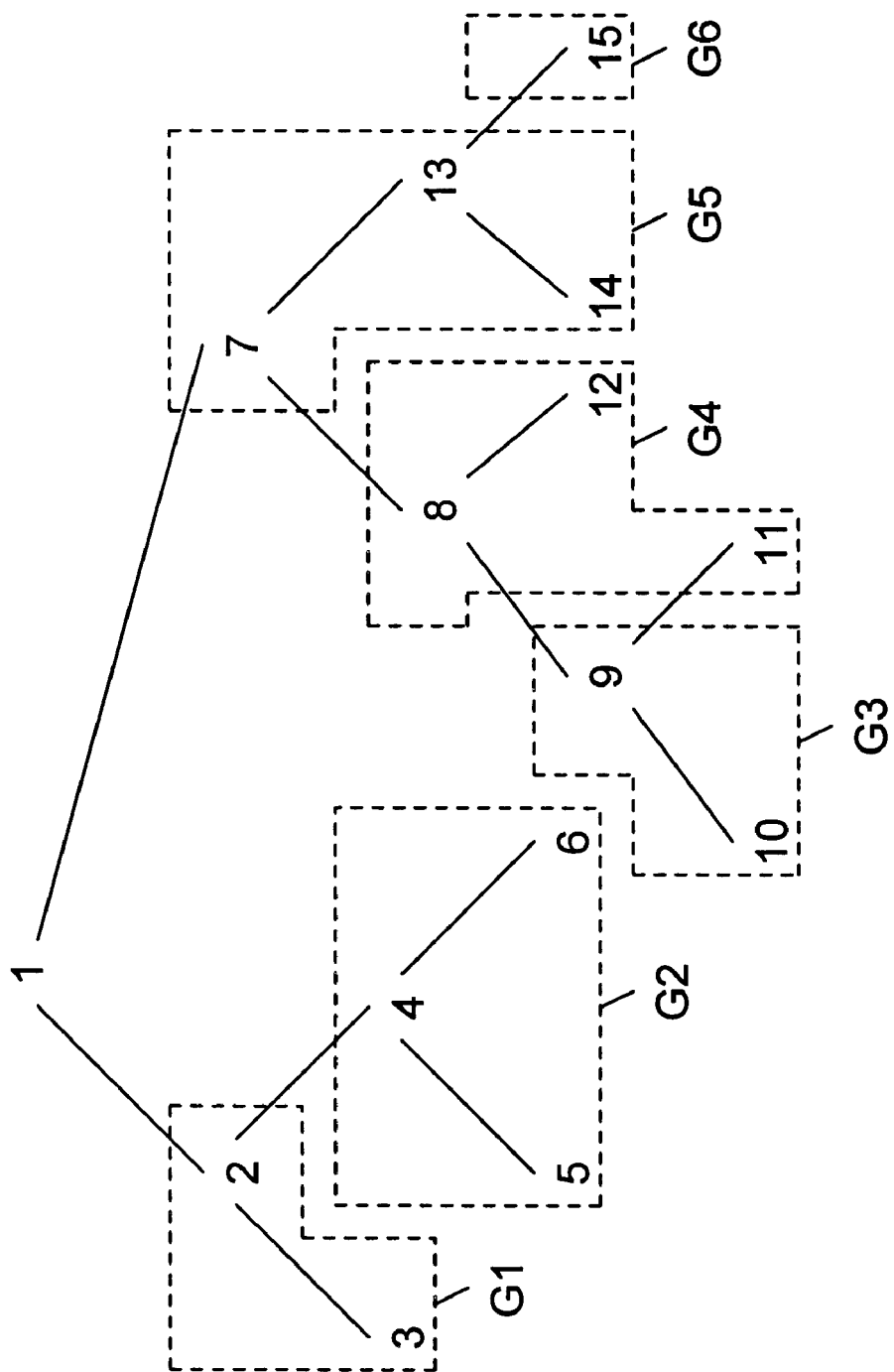
FIG. 4 is a schematic representation of part of a Management Information Base.

As described above, individual agents can be created to support particular parts of an MIB. For example, FIG. 4 is a purely schematic representation of part of a global MIB. For the purposes of illustration, the MIB shown in FIG. 4 is considered to have a root node 1 and sub nodes forming parts of the sub-trees with consecutive numbers 2 through 15.

In the present, purely schematic example, it is assumed that group G2 of nodes is supported by agent A, groups G4 and G6 are supported by agent B and group G5 is supported by agent C. It is assumed that groups G1 and G3 are not supported by any of the agents A, B and C shown in FIG. 3.

Figure 1:
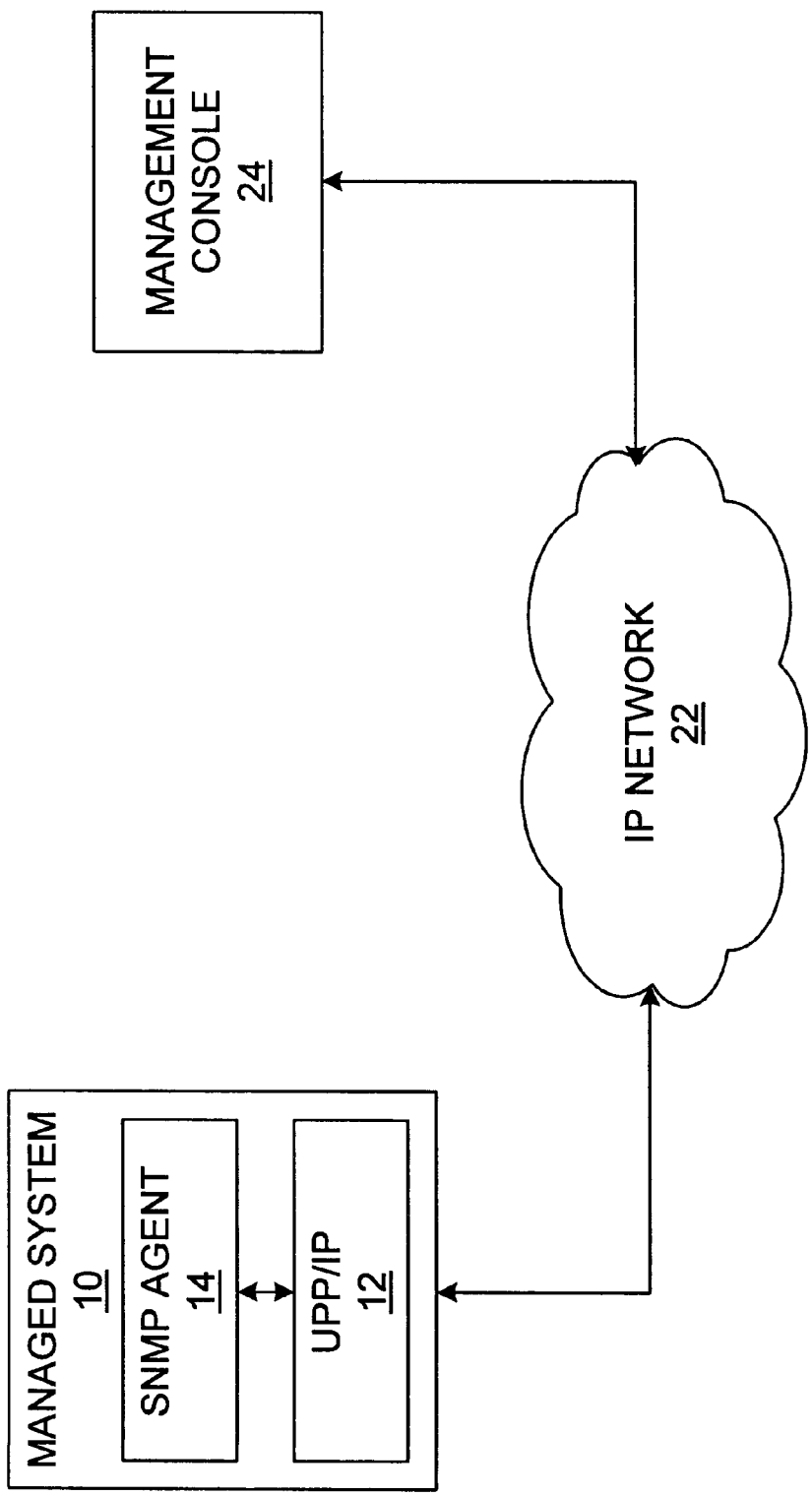
FIG. 1 is a schematic representation of a prior art network management system.
Figure 2:
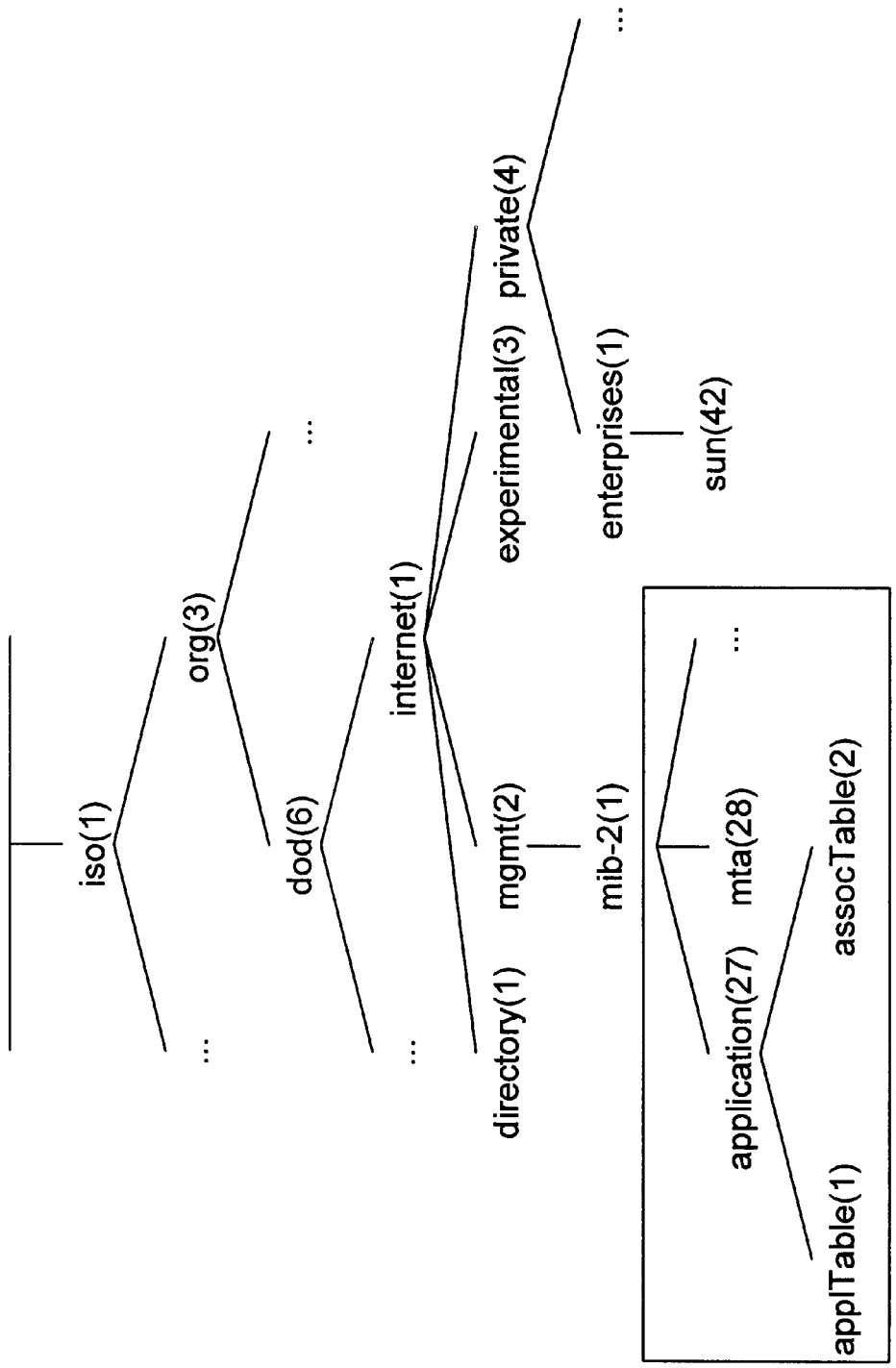
FIG. 2 is a representation of part of a Management Information Base.
Figure 5:
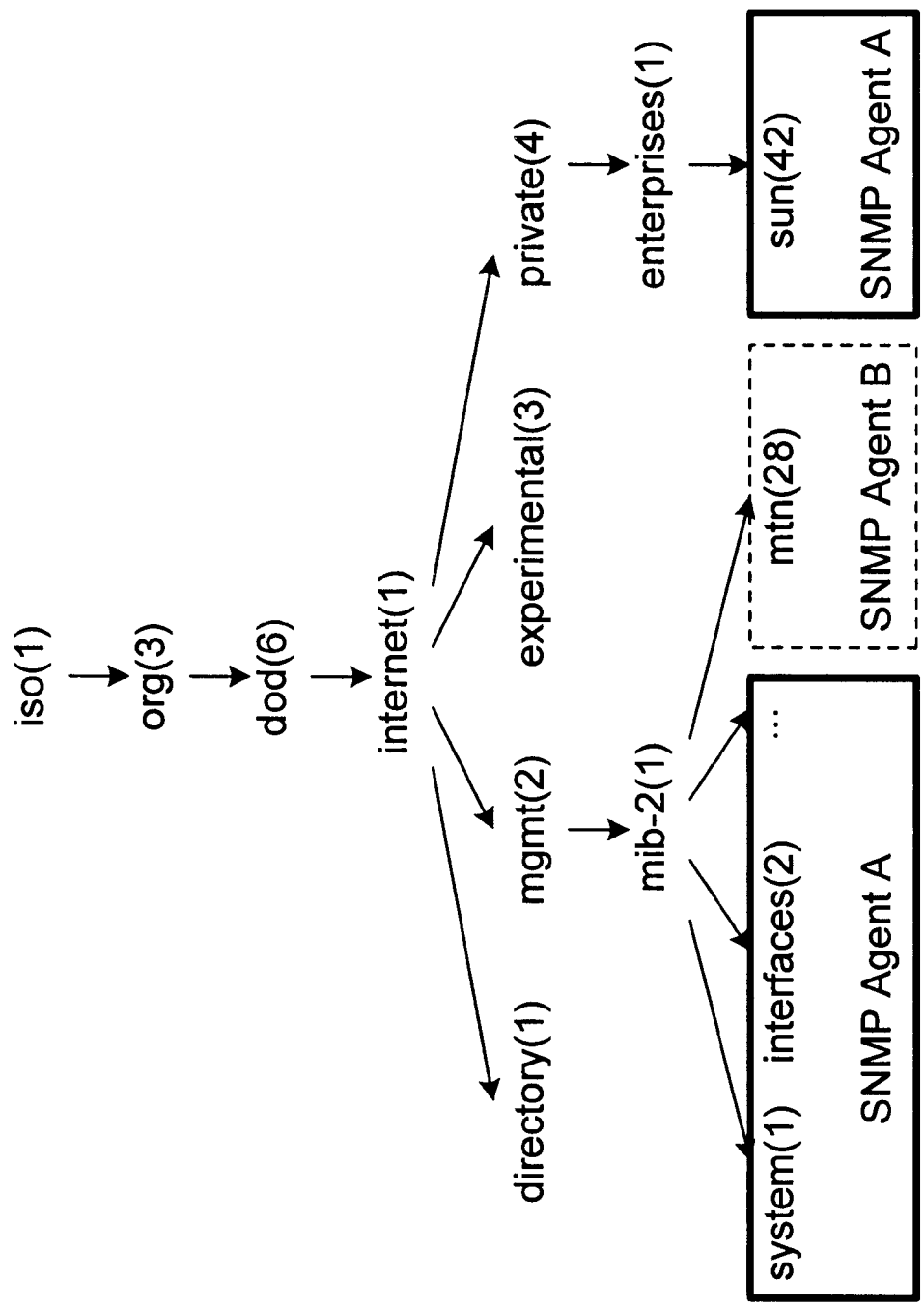
FIG. 5 is a further representation of an example of a Management Information Base.

FIG. 5 is a schematic representation showing how various parts of the global MIB of FIG. 2 can be implemented by respective agents, for example agent A and agent B of FIG. 3.

Figure 6:
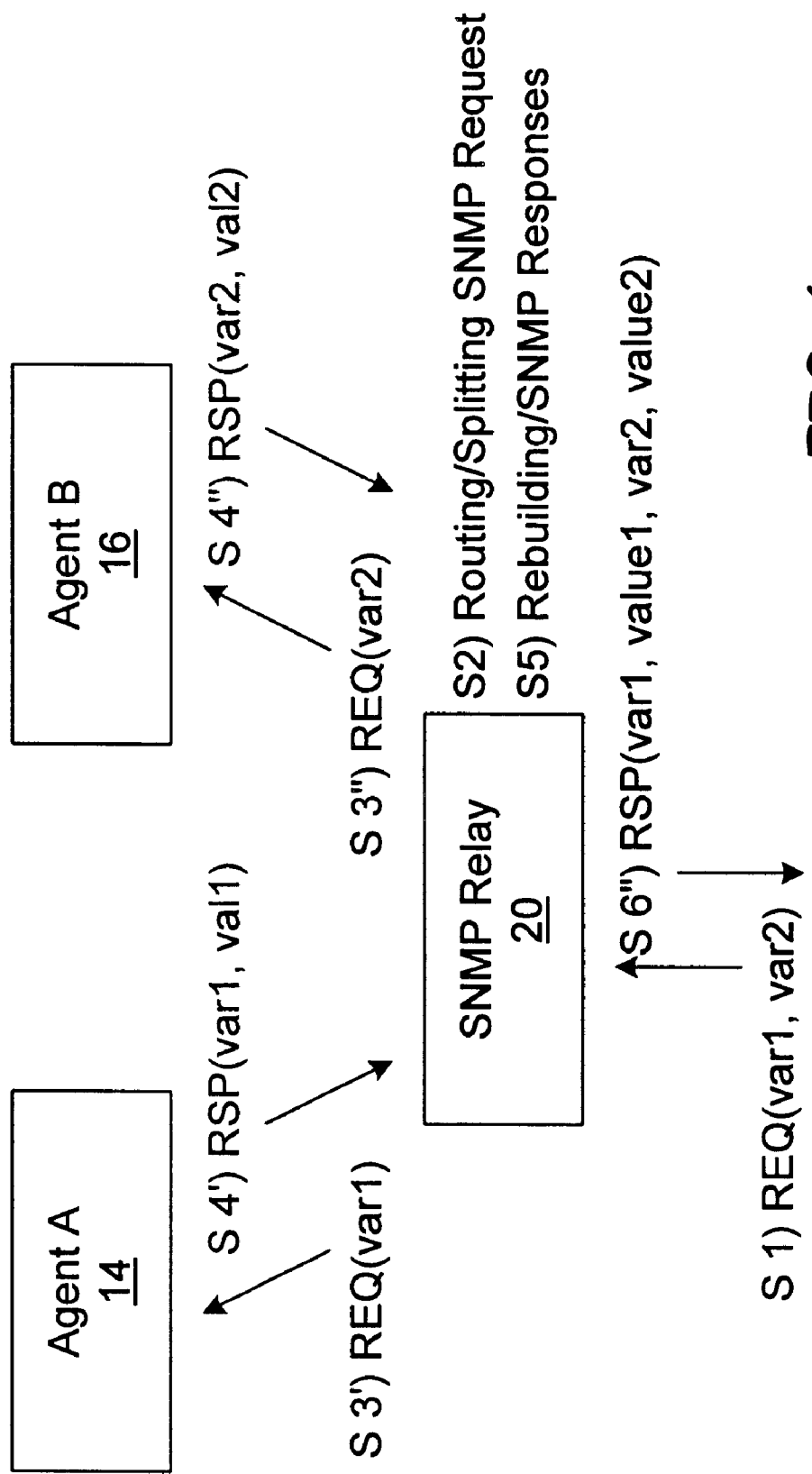
FIG. 6 is a schematic representation of the operation of an embodiment of the invention.
Figure 7:
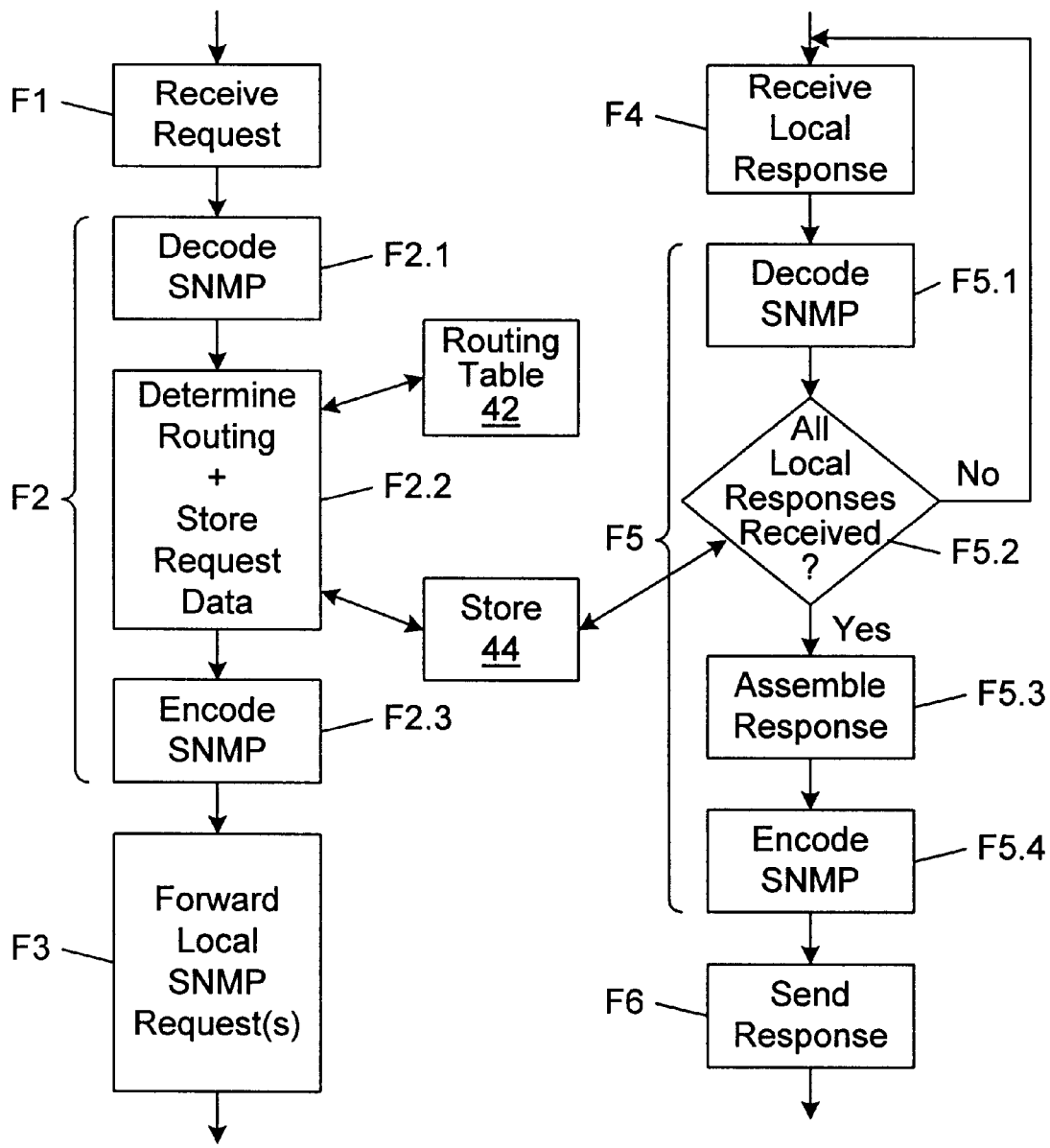
FIG. 7 is a functional block diagram illustrating request and response processing functions of an embodiment of the invention.

The operation of the SNMP relay mechanism 20 of FIG. 3 is represented schematically in FIG. 6, and request and response processing functions of the relay mechanism 20 are illustrated in block diagrammatic form in FIG. 7.

As mentioned above, the SNMP relay mechanism 20 is arranged, in use, to listen to incoming SNMP requests on UDP port 161, there being only one UDP port 161 per device connected to the Internet Protocol network. The SNMP agents, for example agent A 14 and agent B 16 in FIG. 6 are initiated on other UDP ports.

The functioning of the SNMP relay mechanism 20 can be summarised with reference to process steps S1–S6 illustrated in FIG. 6 as follows:

In step S1, the SNMP relay mechanism 20 receives an SNMP request 'REQ(var1,var2)' at UDP port 161 from the Internet Protocol network, for example specifying variable 1 (var1) and variable 2 (var2) as operations to be performed. The variables being the OID numbers of information objects represented in the MIB.

In step S2, the SNMP relay 20 analyses the received request and routes the request to an appropriate agent, for example, as illustrated in FIG. 6, splitting or dividing the SNMP request into two local requests.

In step S3' the first local request 'REQ(var1)' for the first operation is sent to agent A 14, which is an agent equipped to service that request.

In step S3" the second local request 'REQ(var2)' for a second operation is sent to agent B 16, which is an agent equipped to service that request.

Agent A 14 services the request it receives and provides a response 'RSP(var1,val1)' in step S4', returning a value (here val1) for the operation concerned.

Similarly, agent B 16 services the request it receives and provides a response 'RSP(var2,val2)' in step S4", returning a value (here val2) for the operation concerned.

In step S5, the SNMP relay mechanism 20 waits for both responses, and, on receipt of both responses, rebuilds a full SNMP response to the originally received network request 'REQ(var1, var2)'. The response 'RSP(var1,val1,var2,val2)' to that request is then sent in step S6 via UDP port 161 and the Internet Protocol network to the management application which sent the initially received request.

The SNMP relay mechanism 20 performs the routing of individual operation requests as indicated in FIG. 6 by means of the object IDs (OIDs) which are contained in the original SNMP request received at step S1.

As mentioned earlier, each SNMP agent can support one or more MIBs, where a MIB is a collection of variables forming part of the global MIB illustrated in FIG. 2. Each variable in the MIB is uniquely identified by its OID. As the OIDs are structured as a tree (see for example FIG. 5), it is equivalent to consider that an SNMP agent supports a set of MIBs or a SNMP agent supports a set of OID sub-trees.

In order to perform the routing, the SNMP relay employs a routing table. The routing table 42 is represented schematically in FIG. 7. The routing table 42 can be implemented in any appropriate storage technology and file structure. The routing table 42 could, for example be stored in the storage of a computer forming or incorporated in the device 10 in which the relay mechanism is embodied, or alternatively in special purpose storage. The routing table 42 can also be thought of as a "configuration directory" which contains a configuration file containing information for each SNMP agent installed on the same system, or device, as the SNMP relay mechanism 20. The configuration file is compiled from an ASN-1 description of the MIB tree and is set up to reflect the combined single view of all the agents so that each and every agent has a specific placement on the sub-tree. Sub-trees can be registered or unregistered during an install phase and/or later during operation.

In a preferred embodiment, the routing table is implemented by a file structure comprising a configuration directory which points to individual configuration files for each SNMP agent installed on the same device as the SNMP relay mechanism 20.

Each of the SNMP agent configuration files for the SNMP relay mechanism comprises a MACROS section and an AGENTS section.

The MACROS section for each configuration file contains a macro definition, or label, for each of the information objects supported by the SNMP relay. The MACROS section includes the macro, or label for each of the information objects and the complete OIDs (i.e. the complete strings of integers) for the appropriate parts of the global MIB the SNMP agent supports. In this manner, rather than specifying a complete OID for an information object, one or more of the macros may be used instead to define a supported information object.

The AGENTS sections defines:
  the name of the agent daemon for the SNMP agent concerned;
  a list of supported sub-trees, using the macro definitions given in the MACROS section;
  optionally, a list of MIB tables, based on the macro definitions given in the MACROS section;
  a time-out value given in, for example, micro-seconds;
  the UDP port number where the SNMP agent resides.

The routing table can be created at an initialisation time by the relay mechanism 20. This can be responsive to manually input data via input devices (e.g. a keyboard) of the device (e.g. a workstation) in which the relay mechanism is implemented. It can also be envisaged that the relay mechanism could be configured automatically to create the routing table by interrogating the attached agents where the attached agents are provided with mechanism to supply such information. The routing table can also be modified at a time following initialisation using appropriate instructions.

The functions of the SNMP relay mechanism 20 for the processing of SNMP requests and responses will be described in more detail with reference to FIG. 7. FIG. 7 illustrates in block schematic form functional components of an example of request processing and response processing sides of the SNMP relay mechanism 20. The request processing functions are shown in the left column of FIG. 7, the response processing functions in the right column of FIG. 7. The various functions of FIG. 7 can be implemented by software operating on conventional information processing hardware, for example where the device 10 in which the relay mechanism is embodied is a workstation, although some or all of the functions could alternatively be implemented by special purpose hardware (e.g. one or more ASICs), for example where the device 10 in which the relay mechanism 20 is embodied is another form of managed device, but possibly also a workstation.

The request processing functions will be described first. A function F1 of the request processing logic, represented on the left hand side of FIG. 7, of the relay mechanism 20 listens to UDP port 161 for an SNMP management request.

A function F2.1 recognises and decode the incoming SNMP request to extract the operation definition or definitions (var1, var2).

A function F2.2 determines whether the request needs to be split or separated for processing by respective agents by identifying the individual operations to be performed and establishing which agents are equipped to handle those operations with reference to the routing table 42. By referencing the information described above in the routing table, the UDP port at which the agent is located can be identified, as well as the OIDs for the information objects related to the operations to be performed.

When spitting requests, it is necessary to generate identifiers (IDs). Each received request contains a request ID, which is an integer. This is so that the management application which initiated the request can recognise the response thereto.

Figure 8:
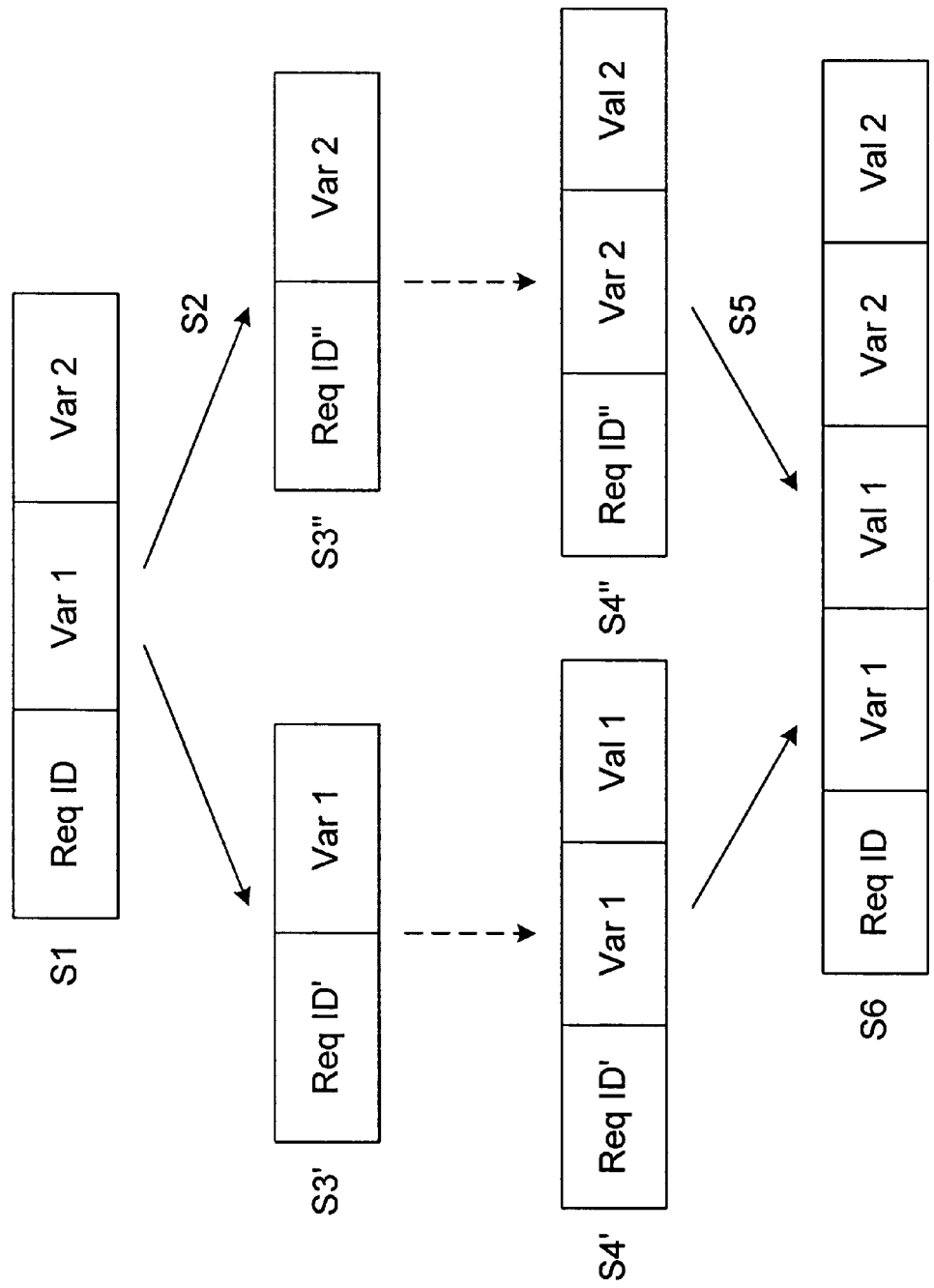
FIG. 8 is a representation of an aspect of the operation of an embodiment of the invention.

FIG. 8 represents the handling of the request IDs in the various steps S1, S2, S3', S3", S4', S4", S5 and S6 shown in FIG. 6.

It is assumed in FIG. 8, as in FIG. 6, that the received request has two operations represented by 'var1' and 'var2', which are to be effected by agent A 14 and agent B 16, respectively. The received request ID (REQID) is shown at S1 in FIG. 8. Preferably, the request ID is a 4 byte ID. At S2, function F2.2 of the relay mechanism 20 generates a first local request ID (REQ ID') which is used at step S3' by function F3 for forwarding the local request relating to variable 'var1' to agent A 14, and a second request ID (REQ ID") which is used in step S3" by function F3 for forwarding the local request relating to variable 'var2' to agent B 16.

Returning to FIG. 7, the function F2.2 also includes the storing of data in storage 44 for the request REQID including the details of the individual local requests having the request IDs REQID' and REQ ID" which are derived therefrom. The storage 44 could, for example be stored in the storage of a computer forming or incorporated in the device 10 in which the relay mechanism is embodied, or alternatively in special purpose storage. The data stored in the storage 44 includes all the information needed to identify which local requests were generated in response to a request received by UDP port 161 and where these were sent.

A function F2.3 encodes in SNMP format each of the local requests represented at S3' and S3" in FIGS. 6 and 8.

A function F3 forwards each local request to the UDP ports identified in the routing table 42 for the respective agents.

The SNMP relay may continue to process further requests received from UDP port 161. However, in respect of the request already received, a function F4 of the response processing logic, represented on the right hand side of FIG. 7, of the relay mechanism 20 waits for receipt of such local responses.

In the present example, there should be two local responses, namely S4' and S4" from agents A 14 and B 16, respectively.

A function F5.1, on receiving a local SNMP response, decodes the SNMP response in order to identify the request ID for the local response. Say, for example, the request REQ ID" of step S4" is received (see FIG. 8), then a function F5.2 accesses the storage 44 to identify whether all other responses have been received which relate to the original request REQ ID received in step S1.

If the local response of step S4" is the first received, this is identified in the storage, and control returns to function F4 to wait for the further (in the present case the only remaining) local response identified at step S4'. The same process is performed when the response for step S4' is received (see FIG. 8) and function F5.2 will determine, with reference to the storage 44, that all responses have now been received. In this case all records relating to the request REQ ID can be deleted from storage 44, if desired.

Control then passes to function F5.3, which assembles the response using the original request ID 'REQ ID' as represented at S6 in FIG. 8. This in encoded as a SNMP response by function F5.4 and is transmitted by function F6 via UDP port 161 to the management application.

In a particularly preferred embodiment, the local request IDs are performed in an asynchronous manner using a single socket. This application is particularly advantageous within a UNIX operating system (UNIX is a registered trademark in the United States and other countries, exclusively licensed through X/Open Company, Ltd.) as the number of sockets a process can open is limited and it is costly in system terms to open a socket. Accordingly, if we suppose that the SNMP relay received a SNMP request: REQ (var1, var2), with a request ID of N, and this request is the Kth request that the SNMP relay received since it was initiated, the request processing logic of the SNMP relay mechanism could split the original request into two requests as indicated below:

REQ (var1) having a request ID=function (K, 1); and

REQ (var2) having a request ID=function (K, 2).

For example, function (K, n) could equal K*65535+n.

By an appropriate choice of the local request IDs, it is possible for the multiplexing performed by the SNMP relay mechanism to be completely asynchronous. Accordingly, if one SNMP agent is slow to answer, the SNMP relay mechanism can continue to process other requests while supported by other SNMP agents.

For a GET operation, if the operation is supported by the SNMP agent concerned, the agent should automatically generate a response using the procedure indicated above. However, if there is some fault, the SNMP relay response mechanism uses the time-out data stored in the configuration file to time-out after a certain time and return an error message as part of the full response to the management application.

The SNMP relay also enables full support of the GET-NEXT operation. The MIB variables are naturally ordered as they belong to a global tree structure (see for example FIG. 2). Accordingly, it is possible to ask the value of the variable following a given variable name. This is the GET-NEXT operation.

If it is supposed that an SNMP relay knows:

a set of SNMP agents: agent A, agent B . . . ;

each SNMP agent N supports a set of sub-trees: sub-tree N1, sub-tree N2, . . . ;

all the sub-trees supported by all the SNMP agents are ordered: sub-tree 1, sub-tree 2, . . . , then the SNMP relay can operate the following procedure:

In step 1 an incoming SNMP request 'GET-NEXT' (varX) is received;

In step S2, a determination is made of which SNMP agent N supports a sub-tree 'sub-tree Ni' that contains 'varX', In step S3 the 'GET-NEXT' (varX) is sent to agent N.

In step S4, a response 'RSP' (varY, valY) is received or the time-out operates.

In step S5:

where a response 'RSP' (varY, valY) is received, then checks are made:

if varY belongs to sub-tree Ni, then this is the right response and the control passes to step S6;

if varY belongs to sub-tree Nj, and there is no sub-tree between sub-tree Ni and sub-tree Nj that is supported by another SNMP agent, then this is a valid response and control passes to step S6;

if varY belongs to sub-tree Nj and there is a sub-tree 'sub-tree Nk' between 'sub-tree Ni' and 'sub-tree Nj' that is supported by another SNMP agent M, then control returns to step S3 and a further 'GET-NEXT' (varX) is sent to agent M; and where time-out is received, the first sub-tree Mk is found that follows sub-tree Ni and is not supported by agent N and then control passes to Step 3 and a local request 'GET-NEXT' (varX) is sent to agent M.

In step S6, the response 'RSP' (varY, valY) is sent to the application.

The relay mechanism 20 can also support MIB variables which are structured as a table. A table consists of one or more columns and 0, 1 or more rows. Each element in the table is identified by its column name (the name of a variable, e.g. an OID) and an index that specifies the row numbers.

The name of the element is obtained by the concatenation of the column name and the index value. For example, if the column name is 1.2.3.4.5 and the index value is 99, the name of the element is 1.2.3.4.5.99.

An element of a table can be considered as a valid sub-tree. Accordingly, using the approach described previously for the 'GET-NEXT' operation, the support of a MIB table can be distributed between a plurality of SNMP agents.

As an alternative to defining a sub-tree as an OID, we can define a sub-tree as an interval of OIDs. For example, a sub-tree can be defined as 1.2.3.4.5.[1–100]. This means that an agent that supports this sub-tree may support the first 100 rows of a table and the 'GET-NEXT' procedure described above still works. In this manner, an agent can reserve some rows in a table because the number of rows in some tables may vary over time.

Figure 9:
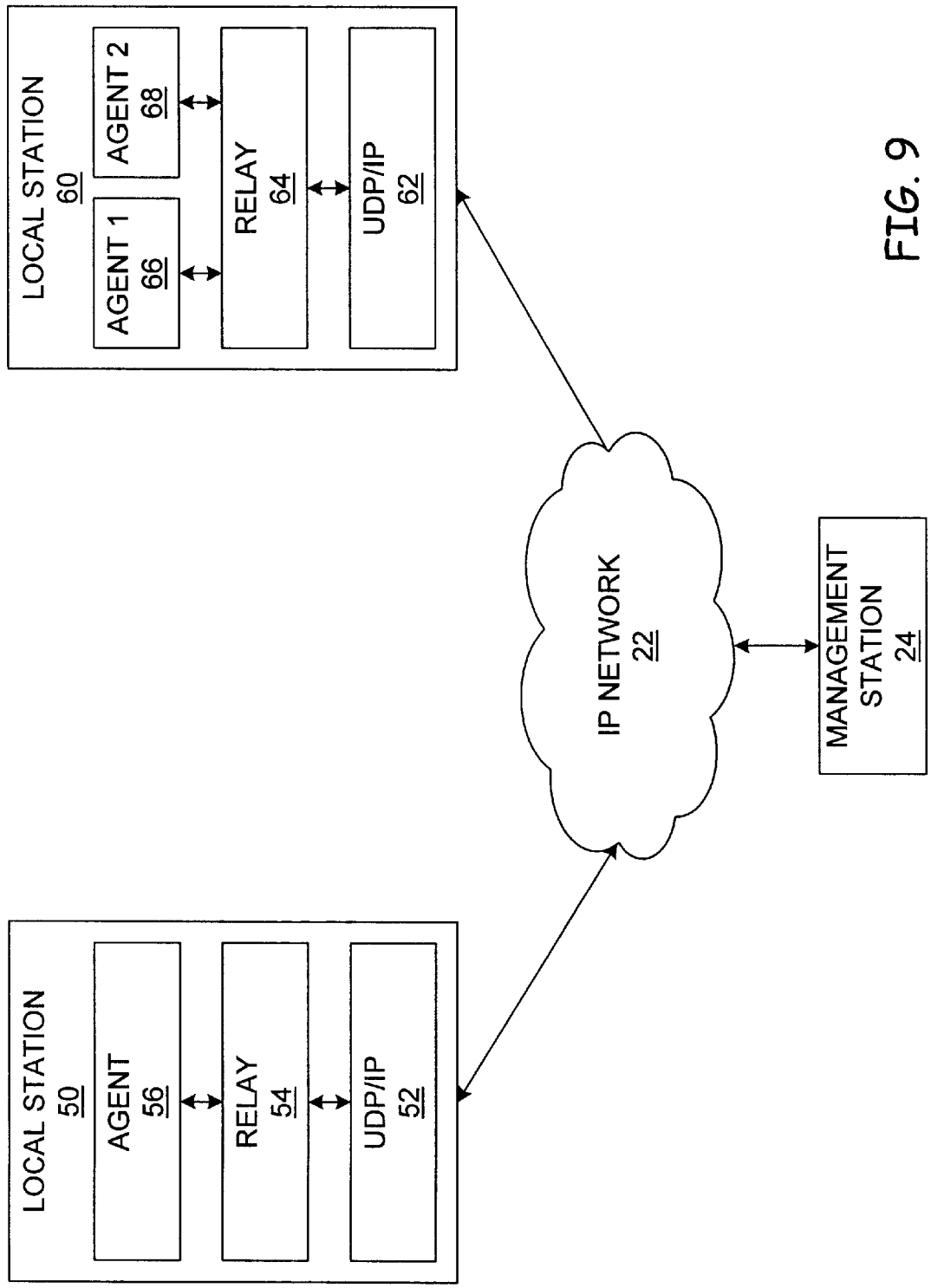
FIG. 9 is a schematic representation of a management information system comprising a management station and two local stations.

FIG. 9 represents a network management system comprising a management station 24 including one or more management applications, which communicates via an Internet Protocol network 22 with a plurality of local stations (here two are shown for simplicity). A first local station 50 comprises a single agent 56 which is connected via a relay 54 and UDP/IP interface 52 at port 161 to the IP network 22. A second local station 60 comprises two agents 66 and 80 connected jointly via a common relay 64 to the UDP/IP interface 61 at port 161 and from there to the IP network. The use of the relay mechanism in accordance with the invention for the relays 54 and 64 ensures that the number of agents provided at each local station is completely transparent to the overall operation of the system. The individual agents can be allowed to send traps out on a separate port 162 in a standard manner.

Accordingly, there has been described a relay mechanism for a network management system which permits ready extension and/or modification to an existing system through the use of standard network protocol agents. Standard SNMP agents can be used as sub-agents within the context of a common relay point for SNMP requests, with the relay mechanism acting as a common relay agent. The relay mechanism uses standard SNMP messaging for both local and remote communication. Only the SNMP relay mechanism is connected to UDP port 161. Each SNMP agent owns sections of a global MIB sub-tree and deals with requests relating to its portion of the MIB. In operation, therefore, the common relay agent examines incoming SNMP requests from the management application(s) and based on a number of parameters, creates one or more individual smaller SNMP requests which are relayed to the individual sub agents. When the SNMP relay mechanism receives all the responses to the local SNMP requests, it marshals the information into a single response which is then sent back to the management application.

The SNMP relay appears to the management application and behaves in every respect as a single primary agent listening on the standard UDP port 161 for requests, and providing responses at that port. The relay mechanism provides a multiplexing function for distributing the individual requests using the MIB structure based on the configuration file or files as described above. As the SNMP relay works with SNMP commands, the relay is able to remain transparent to the individual agents during the period of a session. When a SNMP request with multiple variables is received, the relay associates each variable with a portion of the MIB sub-tree and its corresponding agent before creating the resulting, internal, SNMP request for the respective agents.

In a preferred embodiment, the relay mechanism is implemented by software to be executed on conventional computer hardware. However, in alternative embodiments at least some of the functions could be implemented at least in part by special purpose hardware, for example ASICs.

Although particular embodiments of the invention have been described, it will be appreciated that the invention is not limited thereto, and many modifications and/or additions may be made within the spirit and scope of the invention as defined in the appended Claims. For example, different combinations of the features of the dependent Claims may be combined with the features of the independent claims.

What is claimed is:

1. A method of interfacing a plurality of local network management agents to an information network where each agent can provide a subset of management operations, said method comprising:
   a)(i) analyzing a request received from said network under a predetermined network management protocol to identify each management operation to be performed and to identify an agent for performing each identified operation;
   a)(ii) dividing said received request where more than one agent is identified;
   a)(iii) forwarding, under said protocol, one or more local requests derived from said received request to said respective identified agent or agents;
   b)(i) waiting for and receiving a local response under said protocol for each of said local requests from said identified agent or agents; and
   b)(ii) forming, from said local response or responses, a response under said protocol to said received request to be transmitted over said network;
   wherein said step (a)(i) comprises accessing a routing table to identify management operations performed by each locally connected agent.

2. A method according to claim 1 comprising an additional step (a)(iv) of storing in a memory, for each received request, the identity of each local request derived therefrom and the agent to which each local request is forwarded.

3. A method according to claim 2, wherein step (b)(i) comprises accessing said memory to identify received requests for which a reply is needed and each local request for which a local reply is needed for building said response to said received request.

4. A method according to claim 1, wherein step (a)(iii) comprises allocating a request identifier to each local request, each request identifier of a local request derived from a received request being derived from said request identifier of said received request.

5. A method according to claim 4, wherein each local request identifier is unique.

6. A method according to claim 1, wherein said information network is the Internet and said protocol is the Simple Network Management Protocol.

7. A network management relay mechanism for interfacing a plurality of local network management agents to an information network where each agent can provide a subset of management operations, said network management relay mechanism comprising:
   a request routing mechanism configured to provide functions, in use, of analyzing a request received from said network under a predetermined network management protocol to identify each management operation to be performed and to identify an agent for performing each identified operation, dividing said received request where more than one agent is identified and forwarding one or more local requests derived from said received request to said respective identified agent or agents, each local request being forwarded under said protocol; and
   a response mechanism configured to provide functions, in use, of waiting for and receiving a local response under said protocol to each of said local requests from said identified agent or agents, and forming, from said local response or responses, a response under said protocol to said received request to be transmitted over said network;
   wherein said routing mechanism is configured additionally to provide a function, in use, of accessing a routing table to identify management operations performed by each locally connected agent.

8. A network management relay mechanism according to claim 7 configured to set up, on being initialised, said routing table.

9. A network management relay mechanism according to claim 7, wherein said routing mechanism is configured additionally to provide a function, in use, of storing in a memory, for each received request, the identity of each local request derived therefrom and the agent to which each local request is forwarded.

10. A network management relay mechanism according to claim 9, wherein said response mechanism is configured additionally to provide a function, in use, of accessing said memory to identify received requests for which a reply is needed and each local request for which a local reply is needed for building said response to said received request.

11. A network management relay mechanism according to claim 7, where said received request has a request identifier, said routing mechanism being configured additionally to provide a function, in use, of allocating a request identifier to each local request, each request identifier of a local request derived from a received request being derived from said request identifier of said received request.

12. A network management relay mechanism according to claim 11, wherein each local request identifier is unique.

13. A network management relay mechanism according to claim 7, additionally comprising:
   a network interface mechanism for interfacing to an information protocol network, said first interface being configured to provide functions, when connected to said network, of receiving requests from said network under a predetermined network management protocol, and transmitting responses to said network under said protocol; and
   a local interface mechanism for interfacing to a plurality of local network management agents, wherein each said agent can provide a subset of management functions, said local interface mechanism being configured to provide functions, when connected to said agents, of forwarding requests to said agents under said protocol and receiving corresponding responses from said agents under said protocol.

14. A network management relay mechanism according to claim 7, wherein said mechanism comprises a computer program.

15. A network management relay mechanism according to claim 7, wherein said information network is the Internet and said protocol is the System Network Management Protocol.

16. A network management relay program on a storage medium, said network management relay program being configured to be operable to interface a plurality of local network management agents to an information network where each agent can provide a subset of management operations and comprising:
   a request routing mechanism configured to be operable to provide functions of analyzing a request received from said network under a predetermined network management protocol to identify each management operation to be performed and to identify an agent for performing each identified operation, dividing said received request where more than one agent is identified and forwarding one or more local request derived from said received request to said respective identified agent or agents, each local request being forwarded under said protocol; and a response mechanism configured to be operable to provide functions of waiting for and receiving a local response under said protocol to each of said local requests from said identified agent or agents, and forming, from said local response or responses, a response under said protocol to said received request to be transmitted over said network;

wherein said routing mechanism is configured additionally to provide a function of accessing a routing table to identify management operations performed by each locally connected agent.

17. A network management relay program according to claim 16, wherein said information network is the Internet and said protocol is the System Network Management Protocol.

18. Apparatus comprising a computer having a memory connectable to an information network, a plurality of local network management agents, where each agent can provide a subset of management operations, and a software relay mechanism for connecting said plurality of local network management agents to said information network, said relay mechanism comprising:

a request routing mechanism configured to provide functions, in use, of analyzing a request received from said network under a predetermined network management protocol to identify each management operation to be performed and to identify an agent for performing each identified operation, dividing said received request where more than one agent is identified and forwarding one or more local requests derived from said received request to said respective identified agent or agents, each local request being forwarded under said protocol; and a response mechanism configured to provide functions, in use, of waiting for and receiving a local response under said protocol to each of said local requests from said identified agent or agents, and forming, from said local response or responses, a response under said protocol to said received request to be transmitted over said network;

wherein said routing mechanism is configured additionally to provide a function, in use, of accessing a routing table to identify the management operations performed by each locally connected agent.

19. Apparatus according to claim 18, wherein said relay mechanism is configured to set up, on being initialised, said routing table.

20. Apparatus according to claim 18, wherein said routing mechanism is configured additionally to provide a function, in use, of storing in a memory, for each received request, the identity of each local request derived therefrom and the agent to which each local request was forwarded.

21. Apparatus according to claim 20, wherein said response mechanism is configured additionally to provide a function, in use, of accessing said memory to identify received requests for which a reply is needed and each local request for which a local reply is needed for building said response to said received request.

22. Apparatus according to claim 18, where said received request has a request identifier, said routing mechanism being configured additionally to provide a function, in use, of allocating a request identifier to each local request, each request identifier of a local request derived from a received request being derived from said request identifier of said received request.

23. Apparatus according to claim 22, wherein each local request identifier is unique.

24. Apparatus according to claim 18, wherein said relay mechanism additionally comprises:

a network interface mechanism for interfacing to an information protocol network, said first interface being configured to provide functions, when connected to said network, of receiving requests from said network under a predetermined network management protocol, and transmitting responses to said network under said protocol; and a local interface mechanism for interfacing to a plurality of local network management agents, wherein each said agent can provide a subset of management functions, said local interface mechanism being configured to provide functions, when connected to said agents, of forwarding requests to said agents under said protocol and receiving corresponding responses from said agents under said protocol.

25. Apparatus according to claim 18, wherein said information network is the Internet and said protocol is the Simple Network Management Protocol.

* * * * *